United States Patent
Backhaus

(10) Patent No.: US 9,229,232 B2
(45) Date of Patent: Jan. 5, 2016

(54) DISPLAY SYSTEM FOR TORQUE TOOLS

(71) Applicant: Eduard Wille GmbH & Co. KG, Wuppertal (DE)

(72) Inventor: Michael Backhaus, Dortmund (DE)

( * ) Notice: Subject to any disclaimer, the term of this patent is extended or adjusted under 35 U.S.C. 154(b) by 0 days.

(21) Appl. No.: 14/081,051

(22) Filed: Nov. 15, 2013

(65) Prior Publication Data

US 2014/0139406 A1    May 22, 2014

(30) Foreign Application Priority Data

Nov. 16, 2012    (DE) .................... 20 2012 104 427 U

(51) Int. Cl.
    *G02B 27/01*      (2006.01)
    *B25B 23/142*     (2006.01)
    *G09G 5/00*       (2006.01)

(52) U.S. Cl.
    CPC .......... *G02B 27/017* (2013.01); *B25B 23/1422* (2013.01); *B25B 23/1425* (2013.01); *G09G 5/003* (2013.01)

(58) Field of Classification Search
    CPC .......... B25B 23/1422; B25B 23/1425; G02B 2027/0178
    USPC ........................................... 345/7-9
    See application file for complete search history.

(56) References Cited

U.S. PATENT DOCUMENTS

2008/0208522 A1 * 8/2008 Lucke .......................... 702/151
2013/0137079 A1 * 5/2013 Kahle et al. ................... 434/365

* cited by examiner

*Primary Examiner* — Michael Pervan
(74) *Attorney, Agent, or Firm* — Lawrence G. Fridman, Esq.

(57) ABSTRACT

A display system for a torque tool which is provided for measuring or applying torque comprises a housing having a handle at one end. A measuring arrangement for detecting torque is arranged in the housing. At the other end of the housing a connection element is provided for transmitting torque to a workpiece. Furthermore, a processor-controlled control digitally processes set or measured data and a display cooperates with the control and displays graphic display contents or data, such as the applied or set torque. A transmission device and a separate display device for transmitting and displaying the graphical display contents or data are provided.

8 Claims, 2 Drawing Sheets

DISPLAY SYSTEM FOR TORQUE TOOLS

RELATED APPLICATIONS

THIS APPLICATION CLAIMS PRIORITY OF GERMAN UTILITY MODEL APPLICATION NO. 20 2012 104 427.7 FILED ON NOV. 16, 2012, WHICH APPLICATION IS HEREBY INCORPORATED IN ITS ENTIRETY BY REFERENCE.

FIELD OF THE INVENTION

The invention relates in general to torque tools, and more specifically, it relates to a display system for a torque tool which is provided for measuring or applying torque.

BACKGROUND OF THE INVENTION

The screwed joint is the most commonly used connection in mechanical engineering. Such joining elements can be effective only by use of appropriate installation tools. Torque tools as mentioned above, belong to the suitable installation tools for this purpose. Torque tools are required to exert a certain torque on a workpiece. Known torque tools are, for example, torque wrenches or torque screwdrivers.

The torque transferred when using hand-held tools is dependent both on the physical condition of the user as well as his subjective feeling of power. Torque tools are used to load a high prestressing force to a screw which is within the elastic range of the screw, or to load the screw with only small preload forces. The use of new construction materials such as magnesium, aluminum or plastic, especially for lightweight construction in the automotive or aerospace industry, increases both the need and the requirements for torque tools. By the use of these new materials, the number of sensitive screw connections is increasing. The lower tensile strength of lightweight materials compared to steel materials would lead to damage of the thread if overstressing the screwed connection, which would make these expensive components unusable.

Torque wrenches with a digital torque display are disclosed by prior art DE 20 2008 005 705 U1. DE 20 2007 018 043 U1 describes a torque wrench in which the displayed digits are highlighted by an illuminated display. In doing so, a certain torque range is signalized to the user by the color. Especially when working in places with obstructed view readability is difficult.

The utility model DE 20 2009 002 124 U1 discloses a torque wrench with a display unit which is arranged on the tool shaft of the torque wrench. On the display unit at least two different optical signals can be displayed. The display unit annularly surrounds the tool shaft. As a result, an optical signal for recognizing the applied torque is emitted in all radial directions of the circumference of the display unit so that a user can recognize without a clear view on the display module, to which torque range a just applied torque belongs. For generating the optical signals at least one light emitter is provided in the display unit, for example in the form of light emitting diodes (LEDs).

As Head-up display a display panel is denoted, in which the head may be left up while reading the display. The display panel is always in sight. A field of view display is a display system in which information for a user, such as pilots, is projected into his field of view. This technique has been known in the aviation technology. More recently, this technique has been also utilized in the automotive industry. The head-up display typically consists of a projector, which generates an image, and a projection area. The projection area is a reflective and translucent glass. A suitable optical arrangement with collimator and diversion directs the image on the projection area. Thus, a user of a head-up display recognizes the reflected information which is generated by the projector, and the real world located behind the projection area at the same time. In aviation special small picture tubes are used to generate the appropriate image. Picture tubes produce very high luminosity, and therefore no additional light source is required. On the other hand, LEDs are also often used as a light source. The brightness of the image is controlled in dependence on the ambient light by a photo sensor. Thus, the image is generated by a high-resolution color TFT display.

German Patent Application DE 10 2012 206 962 A1 provides a head-up display, which generates a virtual image to an observer. The virtual image is displayed on a reflector, which is formed by a windshield or the like. For this purpose light of a head-up unit (projector) is reflected from the projection screen. A head-up unit includes a light source that emits light for displaying a video. Furthermore, the projector includes a minor, which controls the optical path of light, and a concave lens for displaying on the windscreen.

German Patent Application DE 10 2011 001 429 A1 discloses a conventional vehicle head-up display which is also known as HUD device. The HUD device displays a light emitting image on a display and projects the display image onto a projection element, such as a windshield. Accordingly, the HUD device displays a virtual image of vehicle-related information. One kind of such a HUD device provided as a vehicle head-up display is a device which reflects a display image of a display on a reflecting mirror, for example a concave minor, and projects the reflected image to a projection element. This HUD device comprises a display, an optical system, a motor and a reduction gear mechanism. The display is configured to display a light emitting image. The optical system includes a reflection minor, which is arranged rotatable relative to the display to reflect the image displayed by the display. The optical system is configured to project the image reflected at the mirror to a projection element of the vehicle, and thereby displaying a virtual image of vehicle-related information on the projection element. The motor is configured to generate a torque to adjust a rotation angle of the mirror in accordance with an external setting instruction. The virtual image can be displayed in a displayable area of the rotational angle of the mirror.

In view of the above, one of the objects of the invention is to provide a display system for a torque tool which facilitates a weight reduction of the torque tool itself. Another object of the invention is to develop a display system that provides the user with substantial information without distracting the user from main work functions.

SUMMARY OF THE INVENTION

One aspect of the present invention relates to a display system for a torque tool which is provided for measuring or applying torque. The system comprises a housing having a handle at one end, wherein a measuring arrangement for detecting torque is arranged in the housing; a connection element at the other end of the housing which transmits torque to a workpiece; a processor-controlled control for digital processing of the set or measured data; a display cooperating with the control and displaying graphic display contents or data, such as the applied or set torque; a transmission device and a separate display device for transmitting and displaying the graphical display contents or data.

One of the essential aspects of the invention does not provide integration of the display system in the torque tool. The user of the torque tool can therefore use the torque tool without having to look at the integrated display constantly. Data or information is received and observed via a separate display. Another important advantage of the invention is that displays do not have to be provided to the torque tools anymore. This ensures that torque tools no longer have to have large displays. In doing so, the torque tools can be not only lighter, but also smaller in size. The electronics for driving the display can also be omitted.

As to one embodiment of the display system for a torque tool which is provided for measuring and/or applying torque, the display device is adapted as a head-up display, also denoted as HUD, having a projection screen on which the display is projected by a projector. The data, information or graphics are thereby projected onto a transparent projection screen. Thus, the display device can be used so that the user of the torque tool can have his eyes on the workpiece to be handled, without taking his eyes from it. The user simply looks through the projection screen and obtains the necessary information projected on the projection screen.

As to another embodiment of the display system, the projection screen is provided on a spectacles-like holder projecting the display by the projector directly in front of an eye of a user. The advantage of this embodiment is that the user has his hands free. In addition, he can handle the work piece using the torque tool without looking away. Nevertheless, the user observes all the necessary data and information.

As to a further embodiment of the display system according to the invention for a torque tool, the transfer device is adapted as a radio connection, an infrared connection and/or a cable connection between the torque tool and the separate display device. In doing so the contact of the display system to the torque tool is achieved. The transmission is usually performed as digital transmission. In addition, the cable connection can provide a power supply contact for the projector. The transmission of data or information can be carried out directly from the torque tool to the projector. In the alternate embodiment, the data or information is first transmitted from the torque tool to an external data processing system. There, the external data processing system processes the data and directs it to the projector. The processed data or information is projected on the projection screen by the projector. The use of an external data processing system also has the advantage that other information can be projected onto the projection screen.

In a preferred embodiment of the display system according to the invention, the projection screen is partially or completely formed as a glass of a pair of spectacles on which the projector projects the display. Since glasses are practically known to all users, no customization is required by the user when using such a display system. The information can be read directly from the spectacles glass. The spectacles glass may be adapted for example, by a suitable coating particularly reflecting the colors of the projector in the eye.

As to still another embodiment of the display system for a torque tool, the separate display device is an LED display. Nowadays, LED displays are relatively inexpensive. The LED display can be formed simultaneously as a projector and a projection screen. The LEDs are transparent, and only the portion is driven to emit light, which is necessary for the representation of information. Another option is that an illuminant lights up the LED display. Thereby, the LED display is controlled in such a way that some areas depict the information. The image which is generated in doing so is projected on the projection screen.

As to still further embodiment of the display system according to the invention, a camera is provided at the torque wrench and/or the spectacle-like holder. Thus, the processes in the operation of the torque wrench or the workpiece can be recorded. The information may be recorded, for example, for archiving. Furthermore, the workpiece can be detected. By suitable image recognition, the correct torque can be queried from a database. The torque wrench can then be adjusted automatically, for example, without direct action of the user.

The display system for the torque tool may also include a voice control and/or an acoustic signal generator so that, the user can control or set the torque tool by voice. In this manner, the user can immediately implement the information he receives from the display system. If required, the torque wrench can acoustically indicate to the user, when a predetermined torque is reached.

Further embodiments and advantages will be apparent from the subject matter of the subclaims and the drawings with the associated descriptions. An exemplary embodiment is described below with reference to the accompanying drawings.

DETAILED DESCRIPTION OF THE INVENTION

Figure 1:
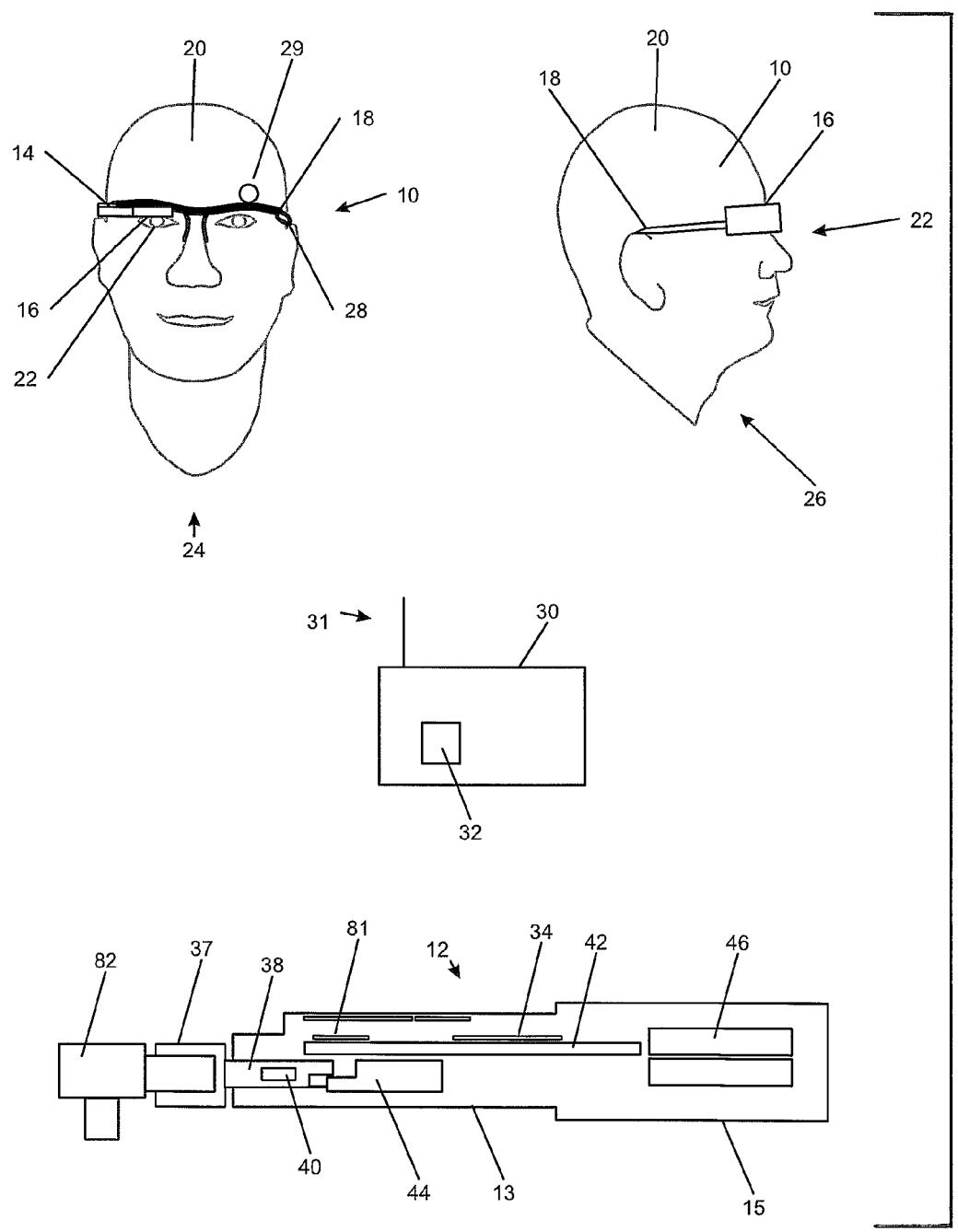
FIG. 1 shows a schematic diagram of a display system for a torque tool according to the invention.

In FIG. 1, a display system according to the invention and for a torque tool 12 is denoted by 10. The torque tool 12 has a housing 13 with a handle 15 at one end. The display system 10 includes a projector 14 and a projection screen 16. The projection screen 16 is attached to a spectacles-like frame or holder 18 and can be worn by a user 20 like a pair of glasses. The projection screen 16 is made of a partially reflective and partially transparent glass or plastic. The projection screen 16 is arranged in front of at least one eye 22 of the user 20. The head of the user 20 is schematically shown once from the front 24 and once from one side 26. The spectacles-like frame 18 is worn like a pair of spectacles and has a receiving device 28 for receiving data or information of the torque tool 12 via, for example, radio. The action of the user having the torque tool 12 can be monitored by a camera 29. In doing so the exact position of the tool torque 12 is determinable. Alternatively, the position in space can determined within the torque tool 12 by sensors 81, which are components of the control electronics 42. It is also possible to display and mark a screw connection on the display system 10. If necessary, a user receives a work plan on the display system 10. This ensures the maintenance of a correct sequence when tightening multiple screw couplings.

The data or information of the torque tool 12 is thereto processed and transmitted by a separate processor-controlled data processing system 30. The data processing system 30 and the torque tool 12 are equipped with a transmission device 31. For this purpose the data processing system 30 comprises a transmitting and receiving device 32. By this means the separate data processing system 30 receives the data or information of the torque tool 12. The torque tool 12 comprises a corresponding transmitting and receiving device 34. Instead of radio links other transmission means are possible for transmitting the data, such as cable or infrared. Typically, the transmission is carried out digitally.

The projector 14 is attached to the spectacles-like frame 18 so that the data or information is projected onto the projection screen 16. On the one hand the projection screen 16 is transparent for the user 20. On the other hand it reflects the data projected on it. The respective image to be displayed is projected by a micro optics arrangement onto the projection screen 16. Therefore, the projector 14 comprises a not shown display generator like an LED indicator. A light source shines through this LED indicator and projects the information via the micro optics arrangement onto the projection screen 16.

An alternative to the projection screen 16 and projector 14 being separate components is to provide them as a unit. The projection screen 16 is also the projector 14 which is controlled. The projection screen 16 consists of a transparent LED display that is controlled appropriate and simultaneously serves as a projector 14. The display areas are then driven so that the user 20 or a viewer can see the processed data.

The torque tool 12 includes a connection element 37 with a measuring head element 38, in which insert tools 82 can be plugged in. The measuring head element 38 comprises sensors 40 for detecting a torque and, optionally, an angle. The torque tool 12 comprises control electronics 42 and a mechanical cut-off mechanism 44. The release of the cut-off mechanism 44 signals that a certain pre-set torque is reached. The control electronics 42 is powered by a power supply 46. The power supply 46 may consist of a power cord. Typically, an accumulator is used, in order to have sufficient freedom of operation.

Figure 2:
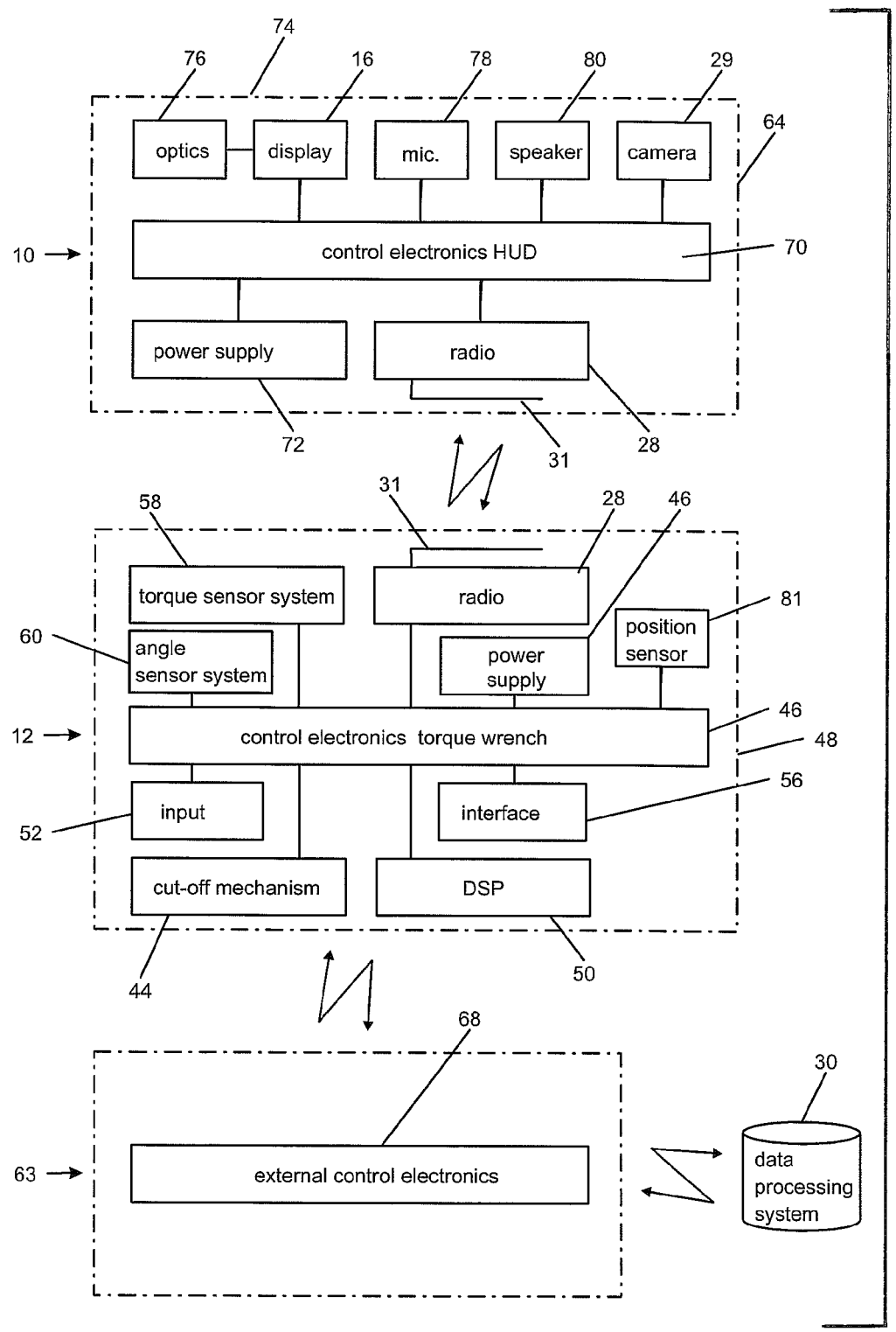
FIG. 2 shows a block diagram of the schematic structure of a display system for a torque tool according to the invention.

In FIG. 2 the schematic structure of the display system 10 according to the invention for the torque tool 12 is shown as a block diagram. A middle block 48 comprises the torque tool 12 with the control electronics 42. The torque tool 12 has a digital signal processor 50, also abbreviated as DSP. Furthermore, an input 52 for controlling the torque tool 12 is provided. This can be a keyboard or a speech input. In block 48, a cut-off mechanism 44 of the torque tool 12 is also shown. Via an interface 56 data can be transmitted bidirectional to the torque tool 12. A sensor system for measuring the torque is designated with 58 and an angle measuring sensor system of the torque tool 12 is denoted by 60. The sensor system 58 for measuring the torque and the angle measuring sensor system 60 comprise the sensors 40. The power supply 46, which is usually a battery or an accumulator, provides the torque tool 12 with the electrical power for operating its electrical components. The torque tool 12 further comprises a transmitting and receiving device 34 with which data can be exchanged via radio. For example, the data is exchanged directly with the display system 10 or with the data processing system 30. Both, the data processing system 30 and the display system 10 are represented as block diagram 63 and 64.

The data processing system 30 is connected to external control electronics 68. The control electronics 68 is used to control the torque tool 12 based on the information from the data processing system 30. Here, for example, the torque values to be used can be transmitted. The transfer of data between the individual components can be wirelessly via radio or infrared or via a data cable.

The display system 10 is also shown as a block diagram 64 and comprises control electronics 70. The display system 10 is a head-up display (HUD). Furthermore, the display system 10 comprises a power supply 72 supplying the electrical components with sufficient voltage. The display system 10 includes a display device 74. The display device 74 consists of an optical assembly 76, the projector 14 and the projection screen 16. As already described above, the projector 14 and the projection screen 16 can be a unit. Usually, an LED display is used for this purpose. The head-up display comprises a microphone 78 for controlling the torque tool 12 or for reading data from the data processing system 30 via voice control. Furthermore, a loudspeaker 80 is provided, via which acoustic signalization is possible when a torque is reached. Other information can also be output via speech or different tones or tone sequences by the loudspeaker 80. The data exchange takes place via the transmitting and receiving device 32 of the head-up display.

What is claimed is:

1. A display system for a torque tool with enhanced interaction between the torque tool and a display device, the system comprising:
   a housing having a handle at one end, wherein a measuring device for detecting torque is arranged in the housing;
   a connection element at the other end of the housing which transmits torque to a workpiece;
   a processor-controlled control for digital processing of the set or measured data;
   a camera is provided at the torque tool for detecting a workpiece; wherein an image recognition queries the correct torque from a database to adjust the torque wrench automatically without direct action of a user;
   a display device cooperating with the control and displaying graphic display contents or data, such as the applied or set torque; the display device is a head-up display having a projection screen on which the display is projected by a projector;
   wherein in the display system data or information is first transmitted from the torque tool to an external data processing system; the external data processing system processes the data and forwards it to the projector.

2. A display system according to claim 1, wherein the projection screen is provided on a spectacles-like holder projecting the display by the projector directly in front of an eye of a user.

3. A display system according to claim 1, wherein the transmission device is adapted as a radio connection, an infrared connection or a cable connection between the torque tool and a separate display device.

4. A display system according to claim 1, wherein the projection screen is partially or completely formed as a glass of a pair of spectacles on which the projector projects the display.

5. A display system according to claim 1, wherein a separate display device is an LED display.

6. A display system according to claim 1, wherein the torque tool comprises a voice control or an acoustic signal generator.

7. A display system according to claim 2, wherein the transmission device is adapted as a radio connection, an infrared connection or a cable connection between the torque tool and a separate display device; the separate display device is an LED display; a camera is provided at the torque tool or the spectacles-like holder; and the torque tool comprises a voice control or an acoustic signal generator.

8. A display system for a torque tool with enhanced interaction between the tool and a display device, the system comprising:
   a housing having a handle at one end;
   a connection element at the other end of the housing for transmitting torque to a workpiece;
   a detecting part arranged within the housing for detecting and obtaining a torque related data from the torque tool,
   a transmitting part for transmitting the obtained torque related data to an external device for processing at an external data processing system, a processing part, wherein the external data processing system processes the torque related data;

a forwarding part for forwarding the processed torque related data to a display device provided for displaying the torque related data; the display device is a head-up display having a projection screen on which the display is projected by a projector; and a camera provided at the torque tool to record operation of the torque tool or processing the workpiece; an image recognition queries a correct torque data from a database, so that the torque wrench is adjusted automatically without direct action of a user.

\* \* \* \* \*